United States Patent [19]

Hunter

[11] 4,257,440
[45] Mar. 24, 1981

[54] INJECTION PUMP FOR SPRINKLER SYSTEMS

[75] Inventor: Edwin J. Hunter, Rancho Santa Fe, Calif.

[73] Assignee: The Toro Company, San Marcos, Calif.

[21] Appl. No.: 41,006

[22] Filed: May 21, 1979

[51] Int. Cl.³ .......................................... G05D 11/035
[52] U.S. Cl. ..................................... 137/99; 222/145; 222/334; 417/271
[58] Field of Search ...................... 137/3, 99; 222/145, 222/334; 415/191; 417/222, 269, 271

[56] References Cited

U.S. PATENT DOCUMENTS

| | | | |
|---|---|---|---|
| 1,726,082 | 8/1929 | McLaughlin et al. | 137/99 |
| 2,566,734 | 9/1951 | Lawrence et al. | 137/99 |
| 2,955,475 | 10/1960 | Zubaty | 417/222 |
| 2,965,065 | 12/1960 | Tinker | 415/191 |
| 3,549,048 | 12/1970 | Goodman | 137/99 |
| 3,815,621 | 6/1974 | Robinson | 137/99 |
| 3,854,664 | 12/1974 | Hunter | 239/204 |
| 3,866,621 | 2/1975 | Greene, Jr. | 137/99 |
| 4,095,921 | 6/1978 | Hiraga | 417/269 |
| 4,138,203 | 2/1979 | Slack | 417/269 |

*Primary Examiner*—Martin P. Schwadron
*Assistant Examiner*—H. Jay Spiegel
*Attorney, Agent, or Firm*—Poms, Smith, Lande & Rose

[57] ABSTRACT

The present invention discloses an improved apparatus for injecting additives into a stream of fluid passing through the apparatus. The apparatus has a housing adapted for connecting to a source of fluid and to an external source of additive and also has an outlet through which the intermixed fluid and additive pass. Fluid entering the housing drives a turbine means, which converts the movement of the fluid into a rotary force. The turbine means is connected to a transmission means which changes the high-speed, low-torque rotary force produced by the turbine means to a rotary force having slower speed but higher torque. The transmission means drives a positive displacement pump means which draws additives from the external source into the fluid passing through the apparatus at a rate which is determined by the speed at which the turbine means rotates. The positive displacement pump means utilizes a wobble disk to convert the rotary motion produced by the transmission means to the reciprocating motion necessary to drive the pistons in the pump means. Additionally, the pump means incorporates multiple cylinders to allow either mixing of additives from various sources with the fluid passing through the apparatus, or to provide a method of controlling the concentration of a single additive injected into the fluid when all of the cylinders are connected to the same additive source.

4 Claims, 12 Drawing Figures

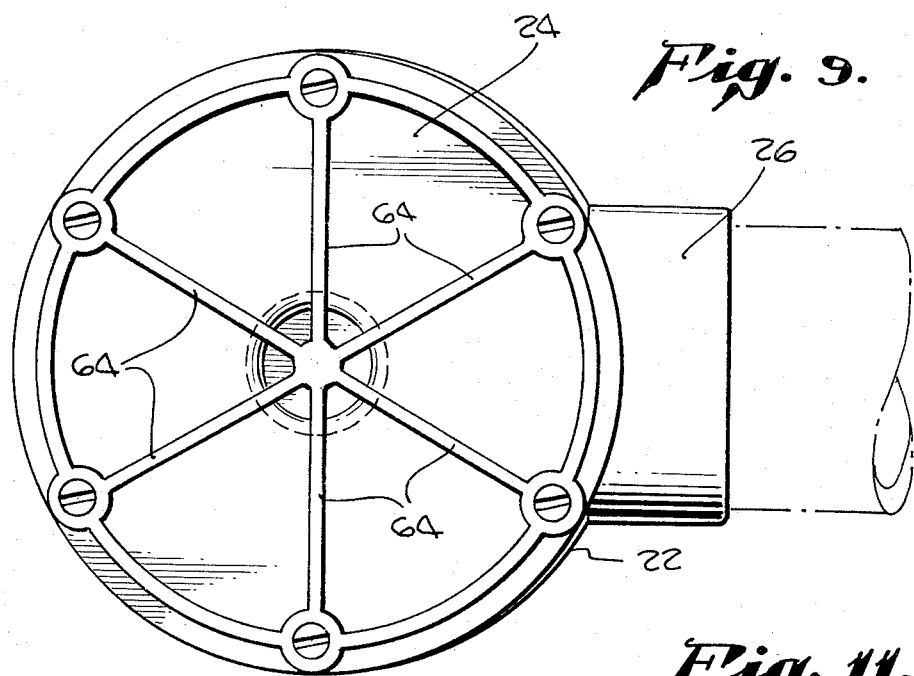
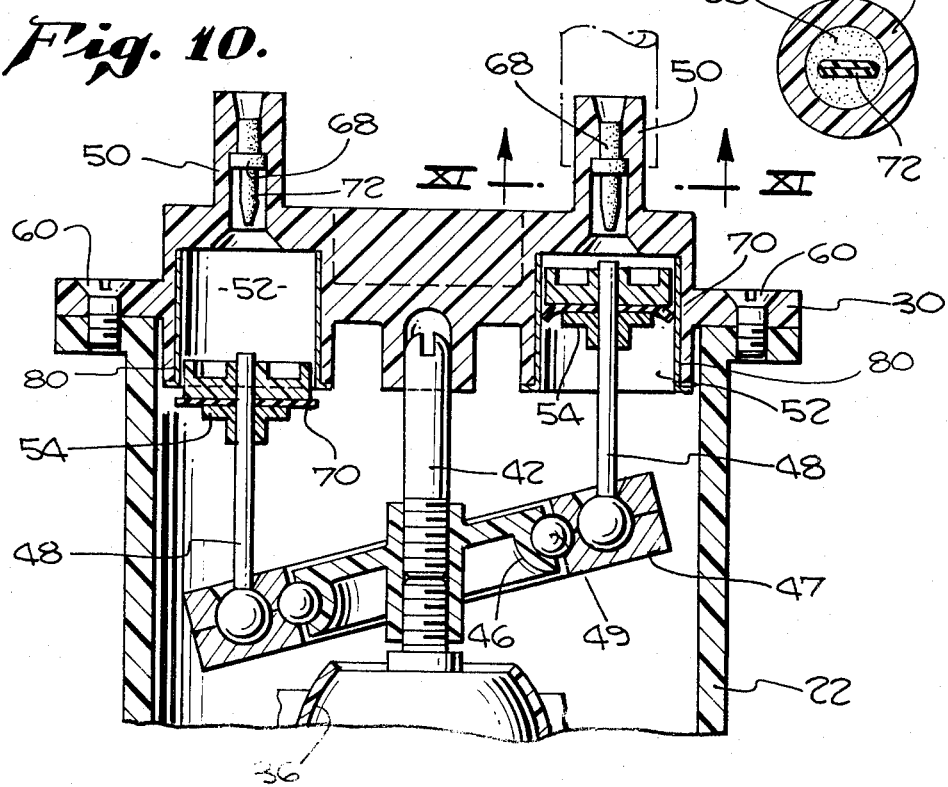

INJECTION PUMP FOR SPRINKLER SYSTEMS

Field of the Invention

The present invention relates to injection pump apparatuses which inject externally-supplied additives into a stream of fluid passing through the apparatus and which are driven by that stream of fluid.

Background of the Invention

Injection pump apparatuses for use in sprinkler systems are known in the art. Most are designed for use in commercial applications such as building landscapes or golf courses.

The limitations of the injection pumps found in the prior art are numerous. First, most of the designs are complicated and thus the injection pumps are expensive. As a result, such pumps are rarely found in residential applications.

Second, the pump portions of most of the injection pumps found in the prior art utilize reciprocating drives connected to pistons or diaphrams. Such designs tend to be rather intricate and thus require periodic maintenance. The ones of these pumps that are designed to operate from the water stream passing through the pump often utilize a good portion of the water pressure of the stream in driving the pump, and thereby cause a decrease in the pressure of the system in which they are installed.

Third, most of the pumps have provisions for only a single source of additives to be injected into the water stream. As a consequence, when several additives are to be injected into the stream, they must be premixed prior to injection. As premixing some additives produces a combination which does not lend itself to easy injection into the stream, the desired additives often must be separately passed through the injection pump. This results in the system having less flexibility than is otherwise possible.

Fourth, many of the injection pumps found in the prior art are driven by external energy sources, such as electricity, operate at unvarying speeds, and are designed to produce a high output volume of intermixed water and additive. Such features make installation of such a pump inpracticable in residential applications, where the high volume produced by the pump would consume a disproportionately large amount of the available water pressure and where the varying water flow sometimes found in residential areas would cause such a pump to operate erratically.

Fifth, most of the injection pumps found in the art have no provision for preventing backflow of the injected additives through them when the water pressure to which the pump is connected suddenly drops. Whenever an additive is injected into a pump connected to a water stream that also supplies drinking water, a backflow preventer must be used to prevent backflow of the additive into the water supply when the water pressure decreases. As the cost of most backflow preventers is high, the necessity of one presents a further barrier to the use of such an injection pump in a residential environment.

Accordingly, it is the principal object of this invention to reduce the cost of an injection pump in order to make the installation of such a pump feasible over a broader range of applications than is currently possible.

It is a further object of this invention to increase the efficiency of an injection pump so as to cause little loss of water pressure of the system in which the injection pump is installed.

It is another object of this invention to simplify the design of an injection pump in order to reduce the required maintenance and to make the pump more reliable.

It is a further object of this invention to provide the capability of injecting additives from multiple sources into a stream passing through the pump, thereby eliminating the premixing or sequential injection otherwise required when different additive sources are used and also allowing greater control over the concentration of a single additive in the resulting mixture when multiple connections are made to a single additive source.

It is still another object of this invention to make an injection pump operable over the wide range of water pressures and volumes found in a residential enviroments.

It is a final object of this invention to eliminate the backflow through the pump which occurs when the water flow ceases.

SUMMARY OF THE INVENTION

The present invention, in a broad aspect, involves an apparatus for injecting externally-supplied additives into a stream of fluid passing through the injection pump. The injection pump includes a housing adapted for connecting to a source of water and to external sources of additives and also having an outlet through which the intermixed fluid and additives leave the pump. Within the housing are the three principal elements of the invention: (a) a water-driven turbine, positioned in the path of the water passing through the housing, which converts a small portion of the kinetic energy of the water flow into a rotary force; (b) a transmission, which is connected to and driven by the turbine, which changes the high-speed, low-torque rotary force produced by the turbine to a rotary fource having slower speed but higher torque; and (c) a positive displacement pump, which connects to and is driven by the turbine, that draws additives from the external sources into the stream of water passing through the pump at a rate determined by the speed at which the turbine rotates.

In accordance with one feature of the invention, the water-driven turbine is of the type referred to as a Caplan turbine. The water entering fhe housing is directed to the inlet of the turbine, which is a fixed stator. The fixed stator channelizes the water entering the turbine into a plurality of streams and directs the streams to form a vortex. A circular wall in the turbine surrounds the produced vortex. The vortex is created around an impeller, which converts the force of the vortex to a rotary motion. The impeller is connected to and drives the transmission. The turbine includes an expansion vane, which is also the structure which directs the water entering the injection pump towards the fixed stator, to guide the water which has struck the impeller toward the positive displacement pump.

The use of a turbine of such a design to provide the power for the pump has several advantages. First, such a turbine can be constructed of low-cost components, thereby making the injection pump apparatus more feasible for residential use. Second, the fact that the turbine operates from the water flow makes its operating speed proportional to the flow rate of the water passing through the injection pump. Consequently, since the positive displacement pump is driven by the turbine, the concentration of additives injected into the water stream remains constant over a wide range of flow rates. Third, the design of such a turbine allows it to generate the power necessary to drive the positive displacement pump and yet cause little corresponding change in the water pressure on either side of the injection pump apparatus. This increase in efficiency also makes the invention more applicable for a wider range of uses than is possible with the injection pumps found in the prior art.

In accordance with still another feature of the invention, the transmission, which connects between the impeller and the positive displacement pump, consists of a plurality of planetary gear reduction stages. The transmission converts the high-speed rotary motion produced by the turbine impeller to the low-speed, high-torque rotary motion necessary to drive the positive displacement pump. The use of a multiple-stage planetary gear drive to provide the reduction function allows the invention to be used with the different flow rates found in sprinkler systems. These flow rates typically can vary from approximately five to one hundred per minute. Differing gear ratios can be used in the transmission to achieve a relatively uniform ratio of additive solution to water with the differing flow rates.

In accordance with still another feature of the invention, the positive displacement pump, which is driven by the transmission, is of a design which is simple and which has a high operating efficiency, thereby allowing great flexibility in applying the pump to different applications. The positive displacement pump has three principal elements: (a) a plurality of inlets, located on the top in the cap of the housing, which route additives from external additive sources to the apparatus; (b) a wobble pump, which connects directly to the transmission, that sequentially draws from each inlet a quantum of additive from each of the external additive sources, and injects this quantum into the water stream passing through the apparatus; and (c) an integral chamber, formed by the inner walls of the housing, in which the intermixing of the externally-supplied additives and the water passing through the housing occurs.

The wobble pump portion of the positive displacement pump includes a wobble disk which connects to the output shaft of the transmission. This disk converts the rotary motion produced by the transmission to a reciprocating motion. A bearing race rides along the edge of the wobble disk and provides a non-rotating reference axis with respect to the wobble disk. Therefore, as the transmission output shaft rotates, the wobble disk causes any point on the bearing race to have an up-and-down motion. A plurality of connecting rods are pivotally attached to the bearing race and upwardly transfer the reciprocating motion produced by the wobble disk to a plurality of pistons. The pistons ride in integral cylinders formed in the top end cap of the housing below the inlets. As the wobble disk wobbles, each of these pistons first draws a quantum of additive from the external additive source through the corresponding inlet into the cylinder in which the piston rides. This quantum of additive is then forced by the piston into the integral chamber, wherein it mixes with the water flowing through the apparatus. This particular operation results in a quantum of additives being sequentially drawn through each inlet and injected into the water stream.

The positive displacement pump described above is simple in design and operation, and consequently requires little maintenance and is economical to construct. Additionally, the use of multiple cylinders presents several advantages not found in the prior art. First, the availability of multiple cylinders allows various types of additives to be simultaneously connected to the injection pump. The mixing of the additives only occurs when the additives are injected into the water stream. This feature eliminates the premixing, or sequential injection, which is otherwise required when single-inlet pumps are used. Furthermore, the use of a multiple-cylinder pump allows a precise control over the concentration of a single additive in the mixture produced by the pump when multiple inlets of the pump are connected to a single additive source. With such a configuration, the concentration of the injected additives may be easily changed by enabling or disabling one or more of the inlets.

In accordance with still another feature of the invention, each of the cylinders in the top end cap of the housing has a metallic lining. Similarly, the piston riding in the cylinder has a pliable seal around its periphery. This configuration improves the efficiency of the positive displacement pump in drawing additives from the external sources into the cylinders.

In accordance with still another feature of the invention, each of the inlets connected to the cylinders in the top of the housing has a "duckbill" valve incorporated in it to prevent the additive in the cylinder from flowing back toward the external additive source when the piston is on its upstroke, which forces the additives in the cylinder into the integral chamber. The use of a cylinder lining further allows the top end cap of the housing to be made of plastic or other low-cost material in which the cylinders can be economically formed.

In accordance with a further feature of the invention, the design of the apparatus helps to prevent backflowing of the additive into the water supply to which the injection pump is connected. Since the positive displacement pump in the injection apparatus is driven by the flow of water passing through the apparatus, any sudden cessation of the water flow will cause the positive displacement pump to stop operating; as a result, no additives will enter the apparatus and backflow to the water source.

In accordance with a final feature of the invention, the invention pump apparatus may be almost completely constructed of plastic, or other easily-formable material such as nylon or delrin.

Other features and advantages of the present invention will become apparent from the consideration of the following detailed description and from the accompanying drawings.

Figure 2:
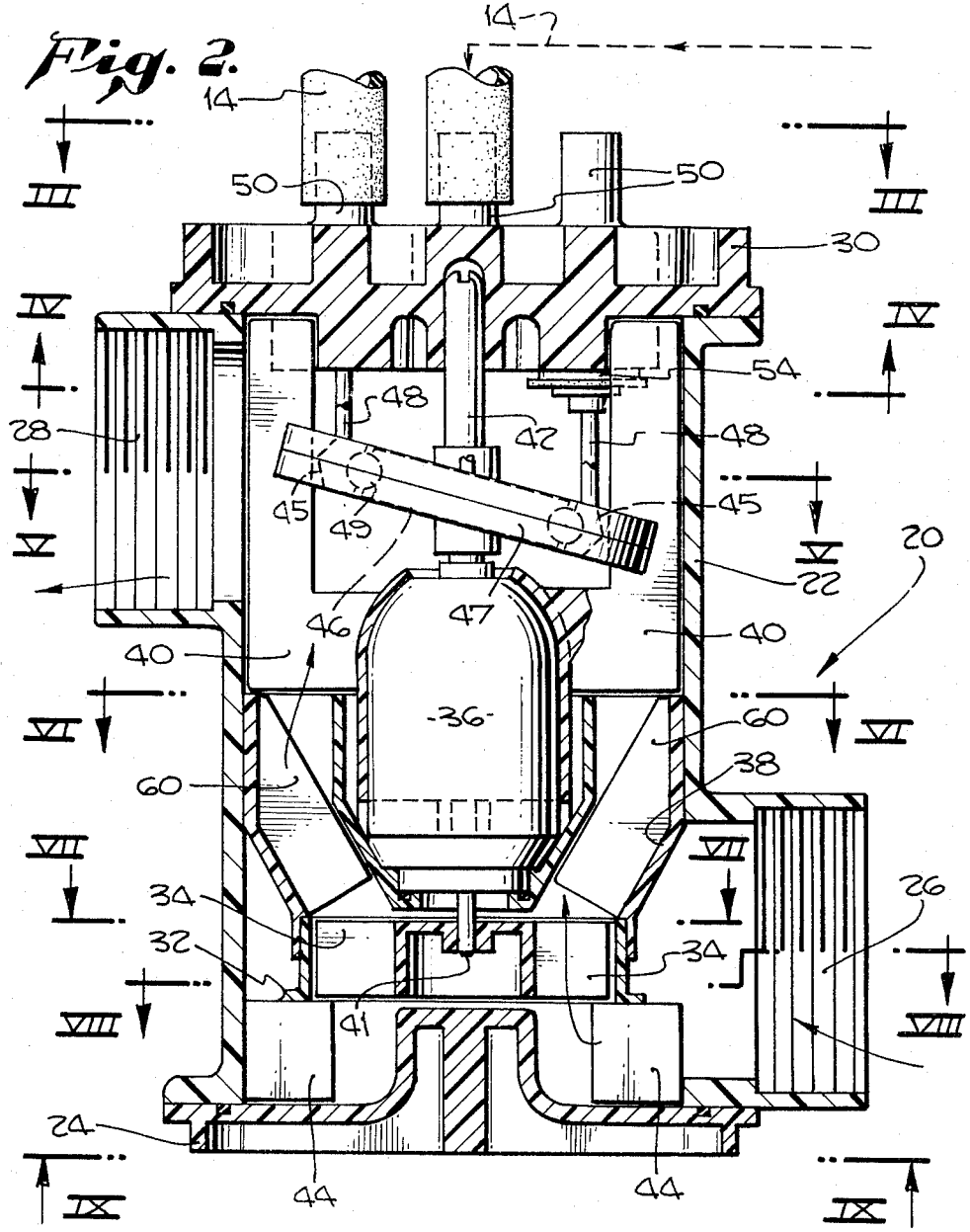
FIG. 2 is a cross sectional view of an apparatus, constructed according to the present invention, for intermixing water flowing through the apparatus with externally supplied additives.
Figure 5:
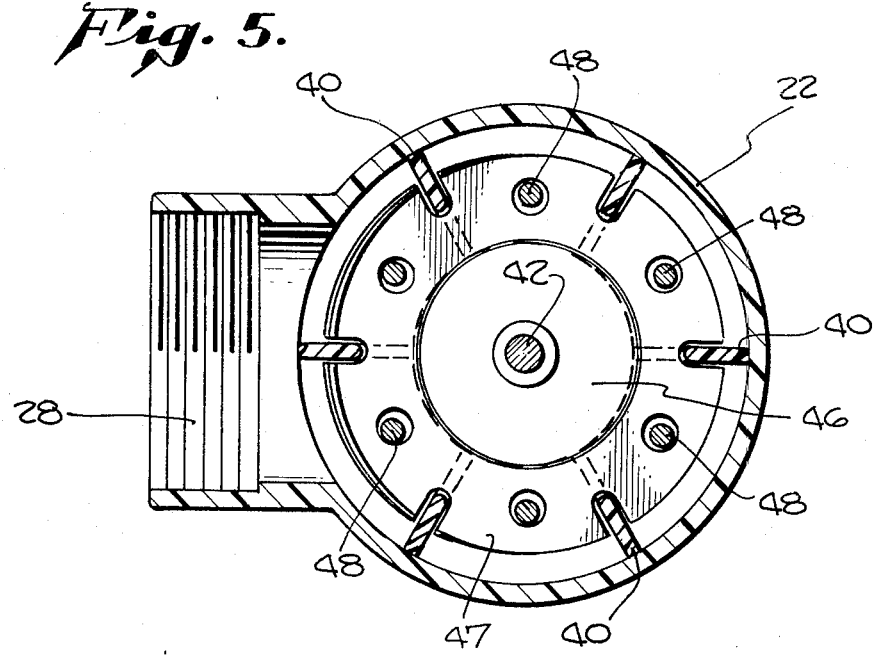
Figure 12:
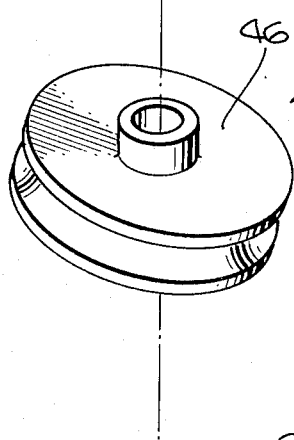
Figure 6:
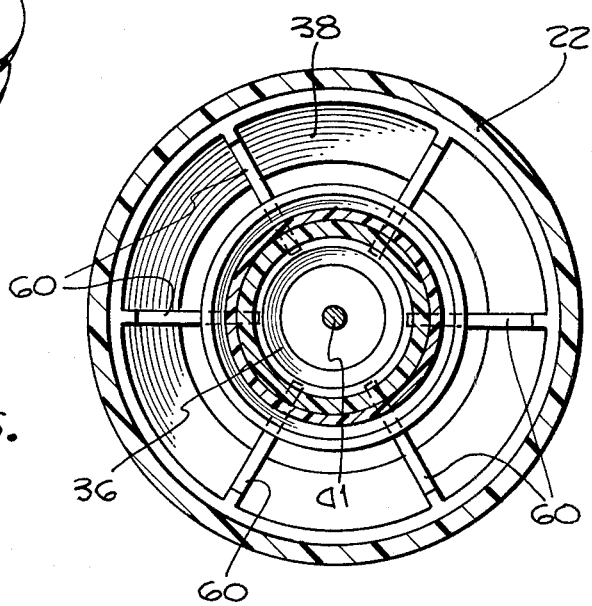
Figure 7:
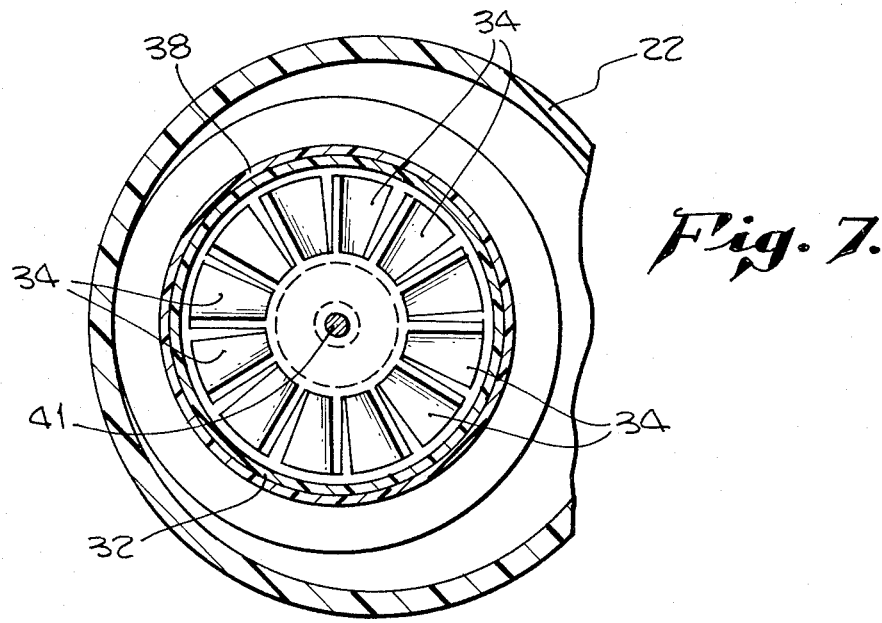
Figure 8:
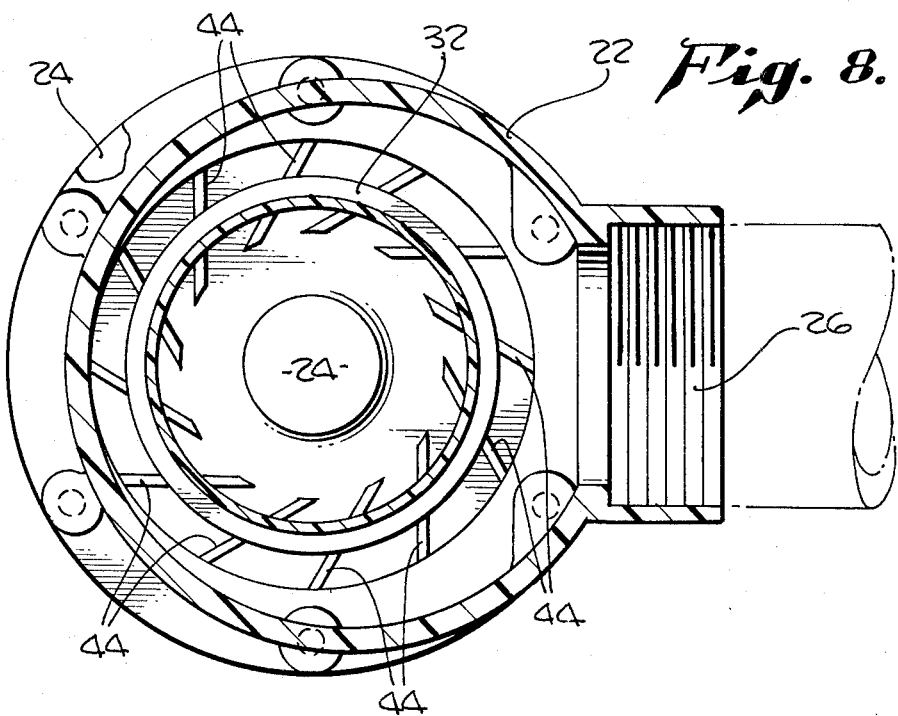

showing the configuration of the cylinders through which additives enter the apparatus and the outlet through which the intermixed water and additives leave the apparatus;

FIG. 5 is a plan view of the invention shown in FIG. 2, taken along plane V—V, showing the chamber wherein the additives are mixed with the water flowing through the apparatus;

FIG. 6 is a plan view of the midsection of the invention shown in FIG. 2, taken along plane VI—VI, showing the transmission means and the passages by which water passes from the lower to the upper section of the apparatus;

FIG. 7 is a plan view of the lower section of the invention shown in FIG. 2, taken along plane VII—VII, showing the impeller which drives the transmission means;

FIG. 8 is a plan view of the lower section of the invention shown in FIG. 2, taken along plane VIII—VIII, showing the fixed stator which creates the vortex of water which drives the impeller;

FIG. 9 is a plan view of the bottom of the invention shown in FIG. 2, taken along plane IX—IX, showing the relationship of the inlet to the housing;

FIG. 10 is a detail cross sectional view of the positive displacement pump in the invention shown in FIG. 2, illustrating its principle of operation;

FIG. 11 is a detail cross sectional view of one of the inlets of the positive displacement pump shown in FIG. 10, taken along line XI—XI; and FIG. 12 is an isometric view of the wobble disk used in the positive displacement pump shown in FIG. 10.

DETAILED DESCRIPTION

Figure 1:
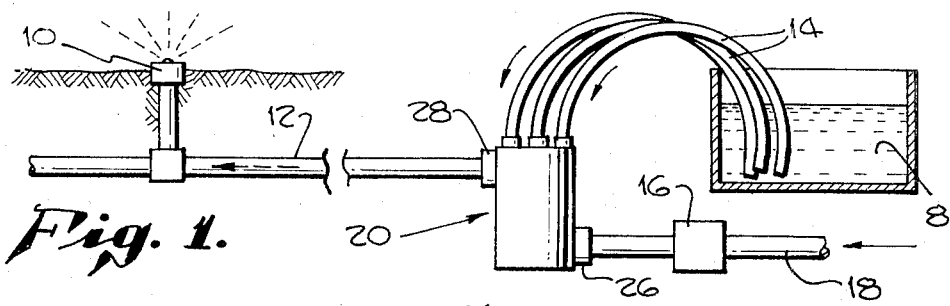
FIG. 1 is a block diagram of a sprinkler system utilizing the present invention.

Referring more particularly to the drawings, FIG. 1 shows an injection pump apparatus 20 installed in a sprinkler system. An input conduit 18 supplies water to the injection pump 20. A plurality of hoses 14 connect from the injection pump to an external source of additives 8. The injection pump 20 mixes water from the input conduit 18 with additives from the external source 8 and drives the resulting mixture through an output conduit 12 to the sprinkler system. The resulting mixture is then discharged through the sprinkler heads 10 in the system. A backflow preventer 16 is used to stop the additives from flowing back through the injection pump 20 and the input conduit 18 to the water source when the pressure of the incoming water decreases.

FIG. 2 shows an injection pump apparatus 20 constructed according to the present invention. The three principal elements of the apparatus 20 are: (a) a Caplan-type turbine, having a fixed stator 32, and impeller 34, and a combined water directing means and expansion vane 38; (b) a transmission means 36 connected to the impeller 34; and, (c) a positive displacement pump having a wobble disk 46, driven by the transmission means 36, to which is connected a plurality of connecting rods 48 and pistons 54. The pistons ride in cylinders 52 formed within the housing 22. The water entering apparatus is directed to turn the impeller 34. The impeller 34 drives the positive displacement pump connected to the transmission means 36. The positive displacement pump draws additives into the apparatus from external sources and injects them into the stream of water leaving the impeller 34.

As can be seen from FIG. 2, all of the components of the apparatus 20 mount to a housing 22. In its lower section the housing has an inlet 26 through which water enters the apparatus 20. At its upper end, the apparatus has an outlet 28 by which the intermixed water and additives leave the apparatus. On the top 30 of the apparatus 20, are a plurality of inlets 50 through which additives from an external source enter the apparatus 20.

As shown in FIGS. 2 and 8, the water entering the apparatus 20 through the inlet 26 is forced by a water directing means 38 to flow through a fixed stator 32 mounted above the bottom end cap 24 of the housing 22. The fixed stator 32 has a plurality of vanes 44 emanating from its periphery and oriented radially toward the center of the housing 22. The orientation of the vanes 44 is such that the water forced between them by the water directing means 38 is directed to form a vortex of high velocity. The bottom end cap 24 of the housing 22 is raised in its center and assists in the generation and maintenance of this vortex. FIG. 9 shows the bottom end cap 24, along with its strengthening ribs 64, in more detail.

As shown in FIGS. 2 and 7, the impeller 34 is located directly above the fixed stator 32 in the path of the vortex created by that stator 32. The blades of the impeller 34 extend diagonally down the sides of the impeller 34. This orientation of the blades causes the impeller to rapidly spin when water is forced by the created vortex past the blades of the impeller 34.

As can be seen in more detail in FIG. 6, the water directing means 38 not only forces the incoming water through the fixed stator 32 but also directs the water which has struck the impeller 34 to the upper part of the apparatus 22 where it is intermixed with the externally-supplied additives. The inner surface of the water directing means 38 has a plurality of vanes 60 which assist in the directing of the water from the impeller to the upper area of the housing 22. The shape of the water directing means 38 is conical to reduce the velocity of the water passing from the impeller 34 to the upper part of the housing. In this context, the water directing means 38 performs the function of an expansion vane. The combination of fixed stator creating a vortex of fluid, an impeller driven by the vortex, and an expansion vane for directing the fluid once it has struck the impeller is commonly referred to as a Caplan turbine.

The impeller 34 drives the transmission means 36 by means of the input shaft 41 of the transmission means 36. The transmission means 36 is the same as that described in U.S. Pat. No. 3,854,664 issued to Edwin J. Hunter on Dec. 17, 1974 and the description of the transmission means therein is incorporated herein by reference. Basically, the transmission means 36 consists of a multiple-stage planetary gear drive which provides a gear reduction capability which is dependent upon the number of planetary gear stages. The transmission means 36 drives the positive displacement pump by means of an output shaft 42. The use of such a transmission means presents a power advantage, not found with injection pumps of other designs, because little of the water pressure is used to drive the positive displacement pump. Therefore, the use of the apparatus in a sprinkler system causes very little change in the water pressure of the system.

After leaving the water directing means 38, the water enters an integral chamber in the upper part of the housing 22 formed by the inner wall of the housing 22, the vaned supporting frame 40 for the transmission means 36, and the upper end cap 30 of the housing 22. It is in this chamber that the water is intermixed with the externally supplied additives.

The positive displacement pump, shown in more detail in FIG. 10, consists of: (a) a wobble disk 46 connected to the output shaft 42 of the transmission means 36; (b) a bearing race 49 and its accompanying frame 47 which contacts the edge of the wobble disk 46; and (c) a plurality of connecting rods 48 and pistons 54, which connect to the bearing race frame 47. The pistons ride in integral cylinders 52 formed in the upper end cap 30 of the housing 22. The wobble disk 46, as shown in FIGS. 5 and 12, is a disk which is angled with respect to the drive shaft passage through its center. The drive shaft passage connects to the drive shaft 42 passing from the transmission means 36. This orientation of the wobble disk 46 converts the rotary motion produced by the transmission means 36 to the reciprocating motion necessary to drive the plurality of pistons 48. The bearing race frame 47 surrounds the wobble disk 46. The frame 47 is prevented from rotating by a plurality of legs in the transmission support frame 40 which pass through a plurality of slots 45 in the frame 47. Thus, as the wobble disk 46 rotates, the connecting rods 48 and the pistons 54 are driven with an up-and-down motion.

The cylinders 52, in the upper end cap 30 of the housing 22, are connected by way of an inlet 50 to a hose 14, which brings additives to the apparatus from an external source of additives. Each of the pistons 54 has a pliable seal 70 around its midsection. These seals 70 assist the pistons 54 in drawing additives through the inlet 50 into the cylinders 52 as the pistons 54 are drawn from the top to the bottom of the cylinders 52 by the wobble disk 46. As each piston 54 is moved from the bottom to the top of each cylinder 52 by the wobble disk 46, the additive in the cylinder 52 is forced past the piston 54 into the integral chamber described above. As shown in more detail in FIG. 11, a duckbill valve 68 in each inlet 50 prevents the additive in each cylinder 52 from flowing back to the additive source 8 when the additive in the cylinder is under compression by the piston 54. The end 72 of the duckbill valve 68 is in the form of a thin slit to prevent the backflow from occurring.

Thus, the basic operation of the positive displacement pump is to sequentially draw into each cylinder 52, on the down-stroke of each piston 54, a quantum of additive from the corresponding inlet 50. On the up-stroke of each piston 54, that quantum of additive is forced into the open chamber where it intermixes with the water in that chamber. The water pressure present in the apparatus from the water source connected to the water inlet 26 continually forces the intermixed water and additives through the mixture outlet 28 of the apparatus.

Figure 3:
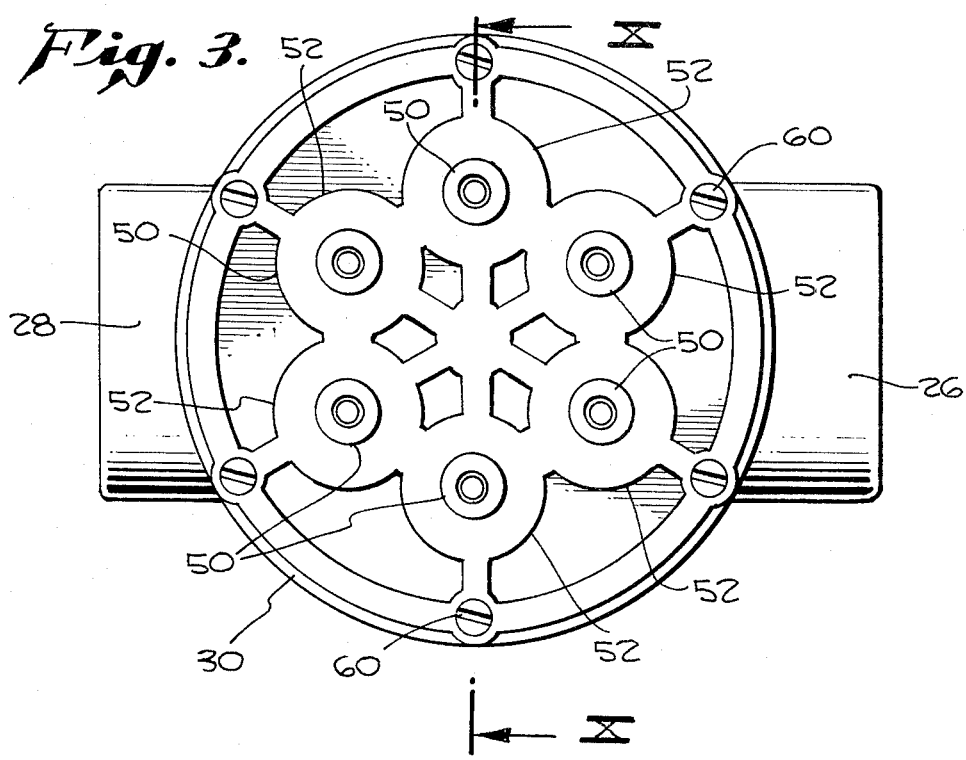
FIG. 3 is a plan view of the top of the invention shown in FIG. 2, taken along plane III—III, showing the configuration of the inlets on the top of the apparatus.
Figure 4:
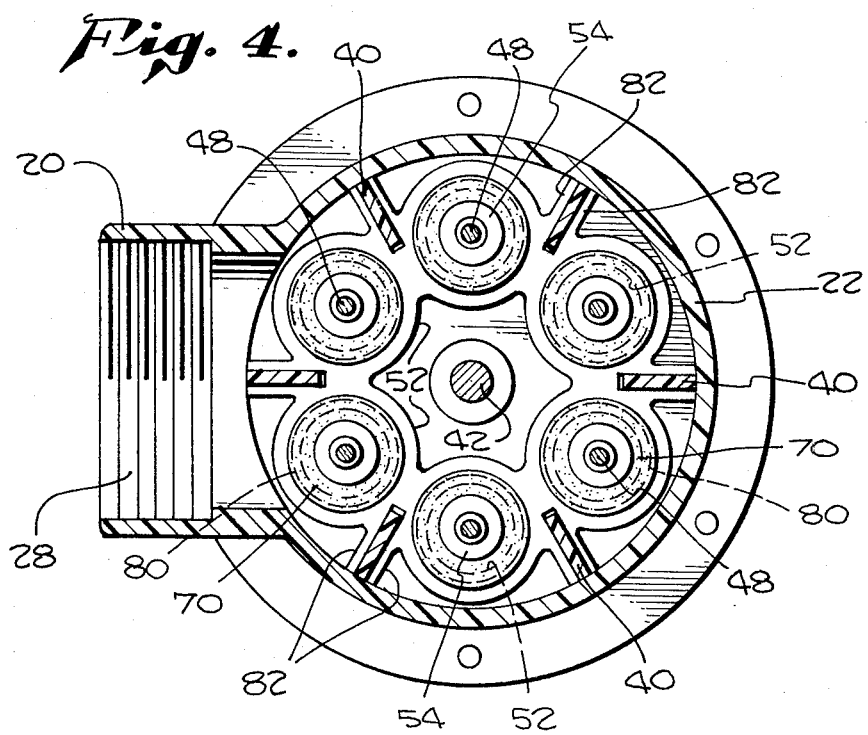
FIG. 4 is a plan view of the upper section of the invention shown in FIG. 2, taken along plane IV—IV.

FIGS. 3 and 4 show the top and bottom sides of the top end cap 30 of the apparatus, which contains the cylinders 52 and the inlets 50. As shown in FIG. 4, each of the cylinders 52 in the apparatus has a liner 80 which may be of metal or other similar material. This liner assists the pliable piston seal 70 in sealing in the area above each piston 54 when the piston 54 is on its downstroke and drawing additives into the cylinder 54. FIG. 4 also shows that the vanes of the transmission means mounting frame 40 each mount between a pair of members 82 on the end cap 30 which form a positioning slot for the vane.

FIG. 3 shows that the upper housing cap 30 mounts to the housing 22 by a plurality of screws 60. FIG. 3 also shows that the cylinders 52 are disposed in a circular fashion about the edge of the wobble disk 46. In this manner, fewer cylinders than the number shown may be used, without altering the basic design of the pump, by simply sealing the inlets 50, and deleting the corresponding pistons 54.

The apparatus described herein provides a mixture of water and additives wherein the concentration of the additives in the water does not change as the flow rate of the supplied water changes. This effect results from using the supplied water to drive the turbine means and the transmission means, and therefore the positive displacement pump. Accordingly, the speed of the positive displacement pump is proportional to the flow rate of the supplied water. As this flow rate changes, the operating speed of the pump changes and thus the quantity of additives injected into the stream also changes. This results in an additive concentration in the water which is relatively constant over a wide range of flow rates.

As shown in FIG. 11, all of the inlet hoses 14 connect to a single additive source. In this regard, and as shown in FIG. 2, each of the inlets 50 may be removed to reduce or eliminate the flow of additive from the external source into that inlet 50. This arrangement would allow, in a situation where all the inlets connect to a single additive source, the concentration of the additive in the outgoing stream of intermixed water and additives to be varied by enabling or disabling the flow of additives through a particular inlet. This type of concentration control is possible since the positive displacement pump sequentially injects a quantum of additive from each inlet 50 into the water stream; consequently, disconnecting any one inlet 50 will result in the corresponding quantum of additive not being taken and the concentration of the additive in the resulting mixture will thereby change.

Additionally, each of the inlets 50 may be connected to a different type of additive. For example, one inlet could go to artificial coloring; one to insecticide; one to herbicide; and, one to plant nutrient. This configuration would result in an outgoing mixture of water and the various additives, and would not require the additives to be premixed together as do injection apparatuses of other designs. This particular configuration would not mix the additives until the additives were drawn into the apparatus. As a result, great flexibility is possible in changing the composition of the intermixed water and additive stream leaving the apparatus.

The present invention is designed to accommodate the differing water flow rates found in sprinkler systems. These flow rates vary from approximately 5 to 100 gallons per minute. In order to maintain a constant ratio of additive to water with the differing flow rates, differing gear ratios may be used in the transmission means 36. For example, a flow rate of 4 to 20 gallons per minute would be used with a gear reduction ratio of 2000:1; a flow rate of 10 to 50 gallons per minute would be used with a gear ratio of 800:1; and a flow rate of 20 to 100 gallons per minute would be used with a gear ratio of 300:1. Additionally, for any given flow rate, the gear ratio in the transmission means can be changed to vary the ratio of additive to water.

Additionally, the ratio of additive solution to water may also be varied by connecting more than one of the inlets to the same additive source. For example, assuming a dilution factor of 2,000:1 with the connection of all six inlets to the same additive source, the dilution factor could be increased to 12,000:1 by blocking five of the inlets. This feature accentuates the flexibility which is possible with the outgoing mixture of water and additives by varying either the number of inlets in the apparatus or by providing means for disabling the additives connected to the inlets which are incorporated in the pump.

In the preferred embodiment of the invention, all of the parts, with the exception of the output shaft 42 of the transmission means 36, the metallic cylinder lining 80, the piston push rods 48, the duckbill valves 68, and the cylinder seals 70, of the invention are molded in one-piece structures of plastic or other easily-formable material such as nylon or delrin.

In the foregoing description of the present invention, a preferred embodiment of the invention has been disclosed. It is to be understood that other mechanical and design variations are within the scope of the present invention. Thus, by way of example and not of limitation, a different turbine than a Caplan-type turbine could be used to drive the positive displacement pump; the positive displacement pump could use means for driving the pistons other than a wobble disk; the inlets and outlets could be in a different orientation on the housing; a transmission means other than the type described could be utilized; and material other than plastic could be used to form the various pieces of the apparatus. Accordingly, the invention is not limited to the particular arrangement which has been illustrated and described in detail.

What is claimed is:

1. An improved apparatus for injecting an additive into a stream of fluid for a sprinkler system having a plurality of sprinkler heads, the apparatus being of the type having a housing adapted for connecting to a source of fluid and an external source of additive and also having an outlet through which said intermixed fluid and additive pass, and pump means, disposed completely within said housing and driven by said source of fluid for drawing additive into said housing and for forcing said additive into fluid from said fluid source, wherein the improvement comprises:

fluid-driven turbine means, disposed within said housing in the path of the fluid passing through said housing, for converting a portion of the kinetic energy of said fluid flow into a rotary force;

transmission means, connected to and driven by said turbine means, for changing the high-speed, low-torque rotary force produced by said turbine means to a rotary force having slower speed but higher torque;

positive displacement pump means, connected to and driven by said transmission means, said pump means including a plurality of piston and cylinder means each in communication with and drawing additive from said external source and pumping the same directly into said fluid passing through said apparatus at a rate determined by the speed at which said turbine means rotates wherein said positive displacement pump means comprises:

a plurality of inlet means, located on the exterior of said housing, for routing additive from said external additive source into said housing;

chamber means, located above said transmission means and in the path of fluid flow from said source to said outlet;

said plurality of cylinder means communicating between said chamber means and said plurality of inlet means, for each collecting a quantum of additive from said inlet means;

and wobble pump means, driven by said transmission means for drawing each said quantum of additive present in each of said cylinder means directly into said chamber means.

2. The improved apparatus defined in claim 1, wherein said turbine means comprises:

fixed stator means, located below said transmission means, for channelizing the fluid entering said apparatus into a plurality of streams and for directing said streams to form a vortex;

circular wall means, connected to and extending upwardly from said stator means, for surrounding said produced vortex;

impeller means, disposed within said wall means and driven by said vortex, for converting the force of said vortex to rotary motion said impeller means including a turbine wheel having its axis of rotation parallel to said path of fluid flow; and fluid directing means, disposed in said housing between fixed stator means and positioned in the path of said incoming fluid, for directing all fluid entering said housing to said fixed stator means and for directing the fluid which has struck said impeller means toward said pump means.

3. The improved apparatus defined in Claim 1, wherein said transmission means comprises:

input shaft means, connected between said turbine means and said transmission means, for coupling the rotary motion of said turbine means to said transmission means;

a plurality of gear reducing means, connected to said input shaft means, for converting the rotory force produced by said turbine means to a rotary force of slower speed but higher torque;

output shaft means, connected between said gear reducing means and said positive displacement pump means, for transferring the rotary force produced by said gear means to said positive displacement pump means; and a transmission housing containing said gear reducing means and a lubricant sealed therein.

4. The improved apparatus defined in claim 1, wherein said inlet means includes valve means for preventing said additive passing through said inlet means from flowing back toward said external source of additive.

* * * * *